United States Patent
Matumura et al.

(10) Patent No.: US 8,292,035 B2
(45) Date of Patent: Oct. 23, 2012

(54) OIL/AIR LUBRICATION SYSTEM

(75) Inventors: Hideyumi Matumura, Inuyama (JP);
Hiroshi Yoshimura, Inuyama (JP);
Tadao Okazaki, Hamamatsu (JP)

(73) Assignee: Daido Metal Co., Ltd., Nagoya (JP)

( * ) Notice: Subject to any disclaimer, the term of this patent is extended or adjusted under 35 U.S.C. 154(b) by 797 days.

(21) Appl. No.: 12/177,124

(22) Filed: Jul. 21, 2008

(65) Prior Publication Data

US 2009/0026016 A1    Jan. 29, 2009

(30) Foreign Application Priority Data

Jul. 19, 2007    (JP) ................. 2007-187961

(51) Int. Cl.
*B23Q 11/12* (2006.01)
(52) U.S. Cl. .................................... 184/6.14
(58) Field of Classification Search ............. 184/6, 6.1,
184/6.9, 6.14, 6.18, 6.26, 6.28, 7.1, 7.4, 14,
184/15.3, 39.1, 50.2, 55.1, 55.2, 108; 73/861.12
See application file for complete search history.

(56) References Cited

U.S. PATENT DOCUMENTS

| | | | | |
|---|---|---|---|---|
| 3,782,501 | A * | 1/1974 | Pagella | 184/6.4 |
| 4,459,858 | A * | 7/1984 | Marsh | 73/861.12 |
| 4,503,384 | A * | 3/1985 | Nagy et al. | 324/690 |
| 4,690,249 | A * | 9/1987 | Olson, Jr. | 184/6.4 |
| 4,785,913 | A * | 11/1988 | Maurer et al. | 184/6.26 |
| 5,402,913 | A * | 4/1995 | Graf | 222/63 |
| 5,675,259 | A * | 10/1997 | Arndt et al. | 324/642 |
| 5,693,892 | A * | 12/1997 | Batey | 73/861.12 |
| 5,852,247 | A * | 12/1998 | Batey | 73/861.17 |
| 5,996,739 | A * | 12/1999 | Hoffmann | 184/7.4 |
| 6,398,509 | B1 * | 6/2002 | Okazaki et al. | 417/44.1 |
| 6,562,012 | B1 * | 5/2003 | Brown et al. | 604/253 |
| 6,623,251 | B2 * | 9/2003 | Nawamoto et al. | 417/290 |
| 6,981,825 | B2 * | 1/2006 | Sugata et al. | 409/136 |
| 7,117,749 | B2 * | 10/2006 | Turner | 73/861.12 |
| 2003/0219345 | A1 * | 11/2003 | Sugita et al. | 417/228 |
| 2009/0026016 | A1 * | 1/2009 | Matumura et al. | 184/6.14 |

FOREIGN PATENT DOCUMENTS

| | | |
|---|---|---|
| DE | 10327329 A1 | 1/2005 |
| JP | 06201092 A | 7/1994 |
| JP | 07269787 A | 10/1995 |
| JP | 08021597 A | 1/1996 |
| JP | 2006258263 A | 9/2006 |

OTHER PUBLICATIONS

German Office Action dated Apr. 1, 2009, English translation, pp. 1-2.

* cited by examiner

*Primary Examiner* — Michael Mansen
*Assistant Examiner* — Mark K Buse
(74) *Attorney, Agent, or Firm* — Browdy and Neimark, PLLC

(57) ABSTRACT

There is provided an oil/air lubrication system capable of surely detecting lubrication oil in oil/air adapted to be fed into a rotary portion of a machine tool. A detection means which is provided to a pipe line in the vicinity of a mixing valve, just downstream of the mixing valve, is adapted to detect a flow of lubrication oil with the use of electromagnetic waves, and accordingly, a flow of air/oil can be accurately detected, irrespective of vibration of the machine tool, influence by the gravity, variation in the flow and a length of the pipe line from the mixing valve to the machine tool, and irrespective of a viscosity of the lubrication oil, and as well, irrespective of the installation of the detecting portion of the detecting means in a vertical direction or a horizontal direction.

3 Claims, 1 Drawing Sheet

OIL/AIR LUBRICATION SYSTEM

BACKGROUND OF THE INVENTION

The present invention relates to an oil air lubrication system for lubricating a rotary portion of a machine tool with oil/air.

DESCRIPTION OF RELATED ART

The oil/air lubrication used for a rotary portion of a machine tool, is carried out in the way that a lubrication oil is intermittently discharged from a mixing valve, and thereafter, is atomized due to influence by a resistance in a pipe line and by compressed air so as to be gradually turned into a continuous flow when it passes through the pipe line. Thus, in view of the reason that the detection of the atomized lubrication oil is difficult and as well in view of the reason that the operational reliability of the mixing valve is lowered due to empty shots caused by an inferior discharge from the mixing valve since the discharge quantity has become microscopic in view of the demand that the discharge quantity of oil per shot from the mixing valve used in the oil/air lubrication for the rotary portion of the machine tool is reduced to a microscopic value (for example, 0.01 mL to 0.05 mL per shot) as the accuracy and operation speed of machine tools have been recently higher, there has being desired a system for detecting a flow of oil/air so as to inform an abnormality to a machine tool or a lubrication pump in order to prevent occurrence of seizure of the rotary portion of the machine tool.

Further, heretofore, for example, JP-A-08-21597, JP-A-06-201092, JP-A-07-269787 and JP-A-2006-258263 have proposed technologies for detection of an oil/air flow.

SUMMARY OF THE INVENTION

However, in the technologies disclosed in JP-A-08-21597, JP-A-06-201092 and JP-A-07-269787, an air pressure is detected by a pressure sensor of a measuring unit in order to determine whether the oil flows or not. In other words, since a microscopic oil is not directly measured but only the air pressure is measured, there has been offered the problem that the reliability of detection of abnormality in the oil/air flow is low.

On the other hand, the invention disclosed in JP-A-2006-258263, utilizes an optical detection system for directly detecting microscopic oil with the use of a reflection of light from oil. However, the detection with the use of the reflection of light is greatly influenced by vibration of a machine tool or an environment where a machine tool is installed (since the optical detection utilizes calculation from the reflection of light, there would possibly be caused a problem of variation in the reflected light due to vibration and as well due to a contamination of a pipe line). Thus, it is difficult to use this detection system as a reliable system for detection of oil/air in the lubrication for the rotary portion of a machine tool, and further, since the pipe line in the detecting portion thereof should be exclusively used, an existing pipe line through which oil/air flows cannot be used as it is, that is, there should be carried out the complicated installation that the existing pipe line is once cut out, and is then fitted in the detection portion. Thus, the use of this system under this circumstance is inappropriate.

The present invention is devised in view of the above-mentioned problems inherent to the prior art, and accordingly, an object of the present invention is to provide an oil/air lubrication system capable of surely carrying out detection of lubrication oil in oil/air fed into to a rotary portion of a machine tool without being affected by vibration of the machine tool or an environment where the machine tool is installed.

To the end, according to the present invention, there is provided an oil/air lubrication system for lubricating a rotary portion of a machine tool with the use of oil/air, characterized by the provision of a pipe line for feeding the oil/air to the rotary portion of the machine tool, a mixing valve connected to the pipe line for mixing microscopic lubrication oil with compressed air so as to form the above-mentioned oil/air and for intermittently discharging the thus formed oil/air, a detection means provided to the pipe line in the vicinity of the mixing valve, that is, just downstream thereof, for detecting a flow of lubrication oil discharged from the mixing valve with the use of electromagnetic waves, and an abnormality signal output means for outputting an abnormality signal when the detection means fails to detect a flow of lubrication oil.

A preferred form of the oil/air lubrication system is characterized in that the detection means is provided to the pipe line at a distance from the mixing valve in a range which is up to a position where the lubrication oil flows in the pipe line, the lubrication oil having a droplet size which is maintained to be greater than a predetermined value.

Another feature is characterized in that the detection means is removably attached to the pipe line so that the detection portion of the detecting means using electromagnetic waves surrounds the outer periphery of the pipe line.

The oil/air lubrication system desirably has a pipe line which is made of a resin group material which is low hygroscopic, or an inorganic material.

In the mixing valve for mixing microscopic lubrication oil and compressed air with each other, and for intermittently discharging them toward the rotary portion of the machine tool, although the lubrication oil is discharged of the lubrication oil from the mixing valve in a condition in which a predetermined quantity (in general 0.01 to 0.05 mL per shot) of the lubrication oil just downstream of the mixing oil is discharged immediately in a batch, but since the intervals of the discharge of the lubrication oil are 4 to 10 minutes, substantially no lubrication oil flows through the pipe line until the next time of discharge, just after the lubrication oil is discharged from the mixing valve. In the condition just after the discharge of the lubrication oil from the mixing valve, the lubrication oil which has been immediately discharged flows in a mass, without pulsation, but becomes finer and finer, being influenced by a resistance of the pipe line through which the lubrication oil flows, and by the compressed air, and accordingly, the flow of the lubrication oil is turned into a continuous pulsating flow. Thus, the applicants directed their attention to the part of the pipe line in which the lubrication oil flows in a mass, and contrived to detect the flow of the lubrication oil in this part. That is, in the invention stated in claim 1, the detecting means is provided to the pipe line, proximate to and just downstream of the mixing valve, the detection means utilizing electromagnetic waves for detecting a flow of the lubrication oil, and accordingly, the flow of the lubrication oil can be detected, irrespective of variation in the flow caused by vibration of a machine tool, and influence by the gravity, the length of the pipe line from the mixing valve to the machine tool and a curve of the pipe line, and as well irrespective of a viscosity of the lubrication oil, thereby it is possible to precisely detect the flow of oil/air, irrespective of the installation of the detecting portion in the vertical or horizontal direction.

Further, as stated above, since the flow of lubrication oil is detected before it is turned into a continuous pulsating flow, with the provision of the detection means to the pipe line within a range up to a position having a distance from the mixing valve, along which the lubrication oil can flow with a droplet size that is maintained to be greater than a predetermined value, the flow of the oil/air can be surely detected.

The detection means is desirably removably mounted to the pipe line so that the detecting portion using electromagnetic waves surrounds the outer periphery of the pipe line, and accordingly, it is possible to eliminate the necessity of a troublesome work such as cutting of the pipe line before the detecting means is mounted to the pipe line. Thus, the flow of oil/air can be accurately detected by the detection means into which the pipe line is merely inserted at a predetermined position therein.

Further, since the detecting portion of the detection means transmits electromagnetic waves into pipe line from the outer peripheral side of the latter in order to detect the lubrication oil in the pipe line, should the pipe line be made of a metal group material, the electromagnetic waves would be substantially totally reflected, resulting in failure in the detection of the lubrication oil, and further, should the pipe line be made of a resin group material which is highly hygroscopic, that is, for example, an ester group polyurethane material having a property which is likely to absorb moisture in the atmosphere in comparison with an ether group resin material, the electromagnetic waves directed to the inside of the pipe line would be absorbed by the moisture absorbed in the pipe line, resulting in the problem of lowering the intensity of the electromagnetic waves having reached in the inside of the pipe line, when the electromagnetic waves are transmitted across the pipe line. Thus, these materials are not desirable for the pipe line. Accordingly, the pipe line is preferably made of a resin group material which is low hygroscopic or inorganic material. As the resin group material, nylon, other group polyurethane, polytetrafluoroethylene (PTFE), acrylic resin, polycarbonate, vinyl chloride or silicone rubber is preferably used. Further, as the inorganic material, quartz glass or the like is preferably used.

DETAILED DESCRIPTION OF THE INVENTION

Figure 1:
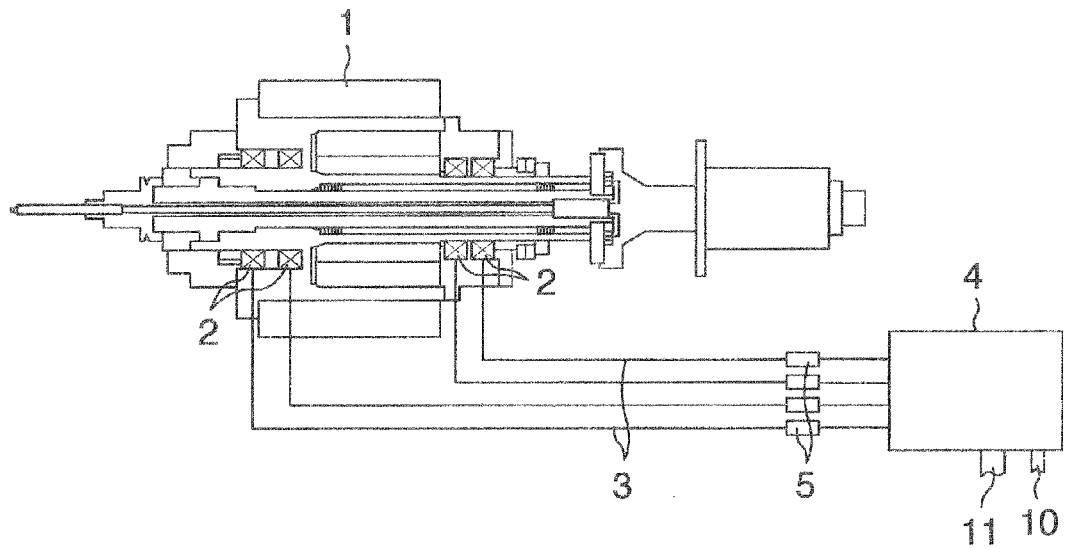
FIG. 1 is a schematic view for explaining a relationship between a mixing valve and a machine tool.
Figure 2:
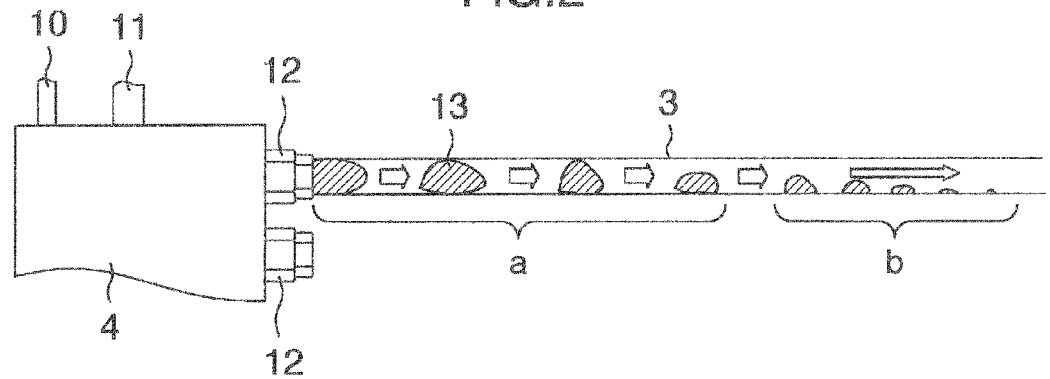
FIG. 2 is a schematic view for explaining a condition in which lubrication oil is discharged from the mixing valve.
Figure 3:
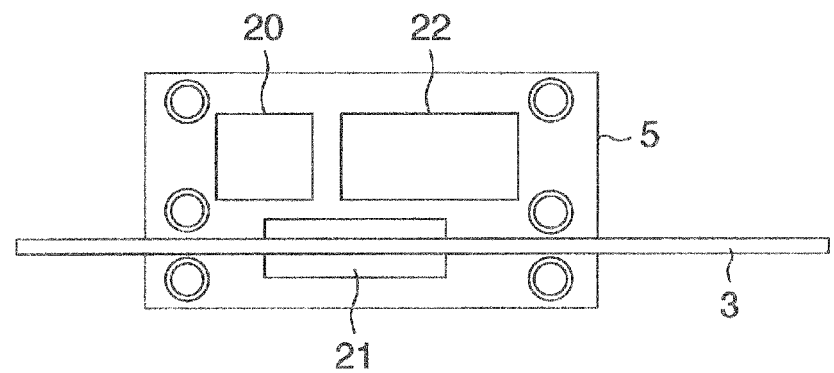
FIG. 3 is a schematic view illustrating a detection system for detecting lubrication oil discharged from the mixing valve.

Next, an oil/air lubrication system in an embodiment of the present invention will be described with reference to the accompanying drawings in which FIG. 1 is a schematic view for explaining a relationship between a mixing valve and a machine tool, FIG. 2 is a schematic view for explaining a condition in which lubrication oil is discharged from the mixing valve, and FIG. 3 is a schematic view illustrating a detection system for detecting lubrication oil discharged from the mixing valve.

Referring to FIG. 1, a machine tool 1 includes an oil/air lubrication system comprising pipe lines 3 for feeding oil/air into a rotary portion 2 of the machine tool 2, a mixing valve 4 connected thereto with the pipe lines 3, for mixing microscopic lubrication oil and compressed air with each other so as to form the oil/air, and for intermittently discharging the thus formed oil/air, a detection unit 5 provided to the pipe line in the vicinity of the mixing valve, just downstream of the mixing valve 4, for detecting a flow of lubrication oil discharged from the mixing valve 4 with the use of electromagnetic waves.

As shown in FIG. 2, the mixing valve 4 has a lubrication oil inlet port 10 and a compressed air inlet port 11 which receive respectively lubrication oil from a lubrication pump (which is not shown), and compressed air, one or more of supply ports 12 (two supply ports shown in FIG. 2) connected thereto with one or more of pipe lines 3 (four pipe lines shown in FIG. 1), and is adapted to mix therein the lubrication oil and the compressed air which have been fed thereinto so as to form oil/air which is therefore discharged into the pipe lines 3 connected to the supply ports 12 by a predetermined quantity (in general, 0.01 to 0.05 mL/shot) at intervals of 4 to 10 minutes (FIG. 2 shows the condition in one of the pipe lines 3). In the condition of the lubrication oil just after the discharge thereof, although the lubrication oil immediately discharged from the mixing valve flows in a mass, since the intervals of discharge are 4 to 10 minutes, substantially no lubrication oil flows in the pipe line just downstream of the mixing valve until the next discharge. Although the lubrication oil just after the discharge thereof from the mixing valve flows in a mass (refer to a condition in a range indicated by "a" in FIG. 2), the lubrication oil becomes gradually finer and finer due to a resistance in the pipe line through which the lubrication flows and the influence by the compressed air, and is finally turned into a continuous flow (refer to a condition shown in a range indicated by "b" in FIG. 2). The applicants have directed their attention to the part in which the lubrication oil flows in a mass, and has contrived to carry out the detection of a flow of the lubrication oil in this part. Further, in this embodiment, the droplet size of the lubrication oil can be maintained to be not less than 0.6 mm in the range indicated by "a" in FIG. 2 as will be detailed later, in the case of a discharge quantity (0.01 to 0.05 mL/shot) used in general, and an air pressure (0.2 to 0.6 MPa) used in general and the pipe line (having a diameter of 1 to 9 mm) used in general, which will be hereinbelow explained in detail.

Further, the detection device 5 comprises an oscillator 20 for producing electromagnetic waves, a detecting portion 21 provided so as to surround the pipe line 3, a control circuit 22 for controlling the oscillator 20 and the detecting portion 21, the control circuit 22 incorporating an abnormality signal outputting means for outputting an abnormality signal when the detecting portion 21 fails to detect a flow of lubrication oil in the pipe line 3, and the oscillator 20, the detecting portion 21 and the control circuit 22 being integrally incorporated with each other. It is noted that as the oscillator 20, there may be used an oscillator for producing 2.45 GHz or 0.93 GHz electromagnetic waves, which is small-sized and inexpensive. That is, electromagnetic waves are induced in the detecting portion 21 by the oscillator 20 so as to directly detect a flow of oil/air from a transiently absorbed electric power which is caused when the lubrication oil passes through the detecting portion 21. It is noted here that no oil flow can be detected in the part in which the lubrication oil becomes microscopic in a continuous flow condition since the size of droplets of the lubrication oil is extremely smaller than the wavelength of the electromagnetic waves. Thus, it is required to arrange the detecting portion 21 of the detection unit 5 at a position where the time when the lubrication oil flows can be distinct from the time when no lubrication oil flows, and accordingly, a flow of lubrication oil can be detected by the electromagnetic waves. Further, as stated above, in the present embodiment, the range of arrangement thereof is that the droplet size of the lubrication oil is maintained to be not less than 0.6 mm. It is noted that an abnormality signal is issued from the abnormality signal output means in the control circuit 22 if no flow of lubrication oil can be detected by the detecting portion 21, and accordingly, a warning lamp provided in the machine tool 1 or the lubrication pump can be lit on in response to the abnormality signal, or the machine tool itself can be stopped in its operation.

Further, since the detecting portion 21 causes the electromagnetic waves to transmit through the pipe line 3 from the outer peripheral side thereof so as to detect a flow of lubrication oil 13 in the pipe line, and accordingly, should the pipe line be made of a metal group material, no lubrication oil could be detected as the electromagnetic waves are reflected thereby. Further, should even a resin group material be used, being highly hygroscopic, the electromagnetic waves passing across the pipe line would be absorbed by the moisture absorbed by the pipe line, resulting in lowering of the intensity of the magnetic waves having reached in the pipe line 3, and accordingly, no lubrication oil 13 could be detected. For example, a polyurethane resin of ester group rather than ether group may readily absorb moisture in the atmosphere, and accordingly, the electromagnetic waves are absorbed by the moisture, that is no lubrication oil 13 can be detected. Thus, in this embodiment, the pipe line 3 is formed of a resin group material or an inorganic material, which has a low hygroscopicity. For example, as the resin group material, there may be used nylon, ether group polyurethane, PTFE, acrylic resin, polycarbonate, vinylchloride or silicone rubber, and as the inorganic material, quarts glass or the like may be used. Further, with the use of the above-mentioned materials for the pipe line 3 itself, there may be eliminated the necessity of the complicated modification that the pipe line is once cut, and then fitted in and jointed to the detecting portion as experienced in the case of using an optical detector. Thus, the pipe line 3 may be extended only through the detecting portion 21 which therefore surrounds the outer periphery of the pipe line 3, whereby it is possible to simply carry out the detection of the lubrication oil. Thus, the detection unit 5 can be removably mounted to the pipe line 3 while the mixing valve 4 and the detecting unit 5 may be fixed to a head part of the machine tool 1 although the details thereof are not shown.

PRACTICAL EXAMPLES

Next, explanation will be made of experimental tests which were carried out with the use of the abnormality detection system shown in FIG. 1, and results thereof. It is noted that the droplet sizes of the lubrication oil were measured in the way that an image of a stop surface of the lubrication oil flowing through the pipe line 3 was picked up, and then was measured with the use of a digital microscope capable of reading dimensions. It is noted that the droplet sizes are diameters thereof measured in the direction of the flow.

The experimental tests were carried out under the following conditions (1) to (3) in order to experimentally confirm oil/air abnormality detectable ranges in the abnormality detection system shown in FIG. 1.

(1) in an experimental test A, the detection of oil/air was carried out by changing the pressure of compressed air under the condition that the discharge volume of the mixing valve was 0.01 mL/shot/10 min., and the bore diameter of the pipe line was 1 mm;

(2) in an experimental test B, the detection of oil/air was carried out by changing the bore diameter of the pipe line under the condition that the discharge volume of the mixing valve was 0.01 mL/shot/10 min, and the pressure of compressed air was 0.6 MPa; and, (3) in an experimental test C, the detection of oil/air was carried out by changing the discharge volume per shot of the mixing valve under the condition that the bore diameter of the pipe line was 1 mm and the pressure of compressed air was 0.6 MPa.

Further, the results of the experimental tests are shown in Table 1, in which the label "ENABLE" indicates a droplet size which could be detected in the detecting portion 21, and the label "DISABLE" indicates that no droplet size can be detected.

TABLE 1

Test A: Measurement Range of Abnormality Detection by Pressure of Compressed Air

| Compressed Air Pressure | Droplet Size Diameter(mm) | | | | |
| --- | --- | --- | --- | --- | --- |
| (MPa) | φ0.2 | φ0.4 | φ0.6 | φ0.8 | φ1.0 |
| 0.2 | DISABLE | DISABLE | ENABLE | ENABLE | ENABLE |
| 0.3 | DISABLE | DISABLE | ENABLE | ENABLE | ENABLE |
| 0.4 | DISABLE | DISABLE | ENABLE | ENABLE | ENABLE |
| 0.5 | DISABLE | DISABLE | ENABLE | ENABLE | ENABLE |
| 0.6 | DISABLE | DISABLE | ENABLE | ENABLE | ENABLE |

Test B: Measurement Range of Abnormality Detection by Pipe Line Bore Diameter

| Pipe Line Bore Diameter | Droplet Size Diameter(mm) | | | | |
| --- | --- | --- | --- | --- | --- |
| (mm) | φ0.2 | φ0.4 | φ0.6 | φ0.8 | φ1.0 |
| φ1 | DISABLE | DISABLE | ENABLE | ENABLE | ENABLE |
| φ3 | DISABLE | DISABLE | ENABLE | ENABLE | ENABLE |
| φ4 | DISABLE | DISABLE | ENABLE | ENABLE | ENABLE |
| φ6 | DISABLE | DISABLE | ENABLE | ENABLE | ENABLE |
| φ9 | DISABLE | DISABLE | ENABLE | ENABLE | ENABLE |

Test C: Measurement range of Abnormality Detection by Specification (Discharge Volume) of Mixing Valve

| Discharge Volume | Droplet Size Diameter(mm) | | | | |
| --- | --- | --- | --- | --- | --- |
| (mL/shot) | φ0.2 | φ0.4 | φ0.6 | φ0.8 | φ1.0 |
| 0.01 | DISABLE | DISABLE | ENABLE | ENABLE | ENABLE |
| 0.03 | DISABLE | DISABLE | ENABLE | ENABLE | ENABLE |
| 0.05 | DISABLE | DISABLE | ENABLE | ENABLE | ENABLE |

Thus, from the results of the experimental test A, it is understood that the droplet size of the oil which is not less than 0.6 mm diameter can be detected under all pressure conditions of compressed air. Further, from the results of the experimental test B, it is understood that the droplet size of the oil which is not less than 0.6 mm diameter can be detected under all bore diameter conditions of the pipe line. Moreover, from the results of the test C, it is understood that the droplet diameter of the oil which is not less than 0.6 mm diameter can be detected under all conditions as to the specifications of the mixing valve.

Thus, it has been found that the detectable range for the oil/air, which was obtained through the experimental tests, depends upon a droplet size of the oil, irrespective of a compressed air pressure, a pipe line bore diameter and a specification of the mixing valve, and that the detection of the oil/air is possible if the droplet size of the oil is not less than 0.6 mm diameter. From these result, and in view of the discharge condition of the mixing valve, the detecting portion 21 can be arranged, in order to carry out stable detection of the oil/air, in the range having a distance from the position where the detecting portion makes contact with the mixing valve, along which the droplet size of the lubrication oil is maintained to be not less than 0.6 mm diameter.

The invention claimed is:

1. An oil/air lubrication system for lubricating a rotary portion of a machine tool with oil/air, said system comprising:
   a pipe line for feeding the oil/air into the rotary portion of the machine tool;
   a mixing valve connected to the pipe line, for mixing microscopic lubrication oil and compressed air with each other so as to form the oil/air, and for intermittently discharging the oil/air;
   a detecting means provided to the pipe line in the vicinity of the mixing valve, just downstream of the mixing valve, for detecting a flow in mass of the lubrication oil just after being discharged from the mixing valve, with the use of electromagnetic waves having a frequency of 2.45 GHz or 0.93 GHz;
   an abnormality signal output means for outputting an abnormality signal when the detection means fails to detect the flow of lubrication oil; and
   wherein the detection means is removably attached to the pipeline so as to cause a detecting portion of the detection means to surround the outer periphery of the pipeline.

2. An oil/air lubrication system as set forth in claim 1, wherein the detection means is provided to the pipe line in a range having a distance from the mixing valve to a position where the lubrication oil flows in mass in the pipe line, the lubrication oil having a droplet size which is maintained to be greater than 0.6 mm.

3. An oil/air lubrication system as set forth in claim 1 or 2, characterized in that the pipe line is made of a resin group material or an inorganic material, said resin group material being any one of nylon, ether group polyurethane, PTFE, acrylic resin, polycarbonate, vinylchloride or silicone rubber.

* * * * *